United States Patent [19]
Spiesberger

[11] 3,978,356
[45] Aug. 31, 1976

[54] SELF-STARTING SYNCHRONOUS MOTOR WITH PERMANENT MAGNET ROTOR

[75] Inventor: August Spiesberger, Lahr, Germany

[73] Assignee: Gerhard Berger Fabrikation Elektrischer Messgerate, Lahr, Germany

[22] Filed: July 24, 1974

[21] Appl. No.: 491,227

[30] Foreign Application Priority Data
July 26, 1973 Germany............................ 2337905

[52] U.S. Cl.............................. 310/156; 310/162; 310/164; 310/49 R
[51] Int. Cl.² ......................................... H02K 21/12
[58] Field of Search ........... 310/162, 193, 254, 156, 310/41, 49 R, 116, 118, 188, 163, 164, 165

[56] References Cited
UNITED STATES PATENTS

| | | | |
|---|---|---|---|
| 2,432,573 | 12/1947 | Jorgensen............................ | 310/164 |
| 2,794,137 | 5/1957 | Faus et al. ........................ | 310/156 X |
| 3,396,295 | 8/1968 | Rawcliffe et al..................... | 310/162 |
| 3,439,200 | 4/1969 | Saito et al........................... | 310/49 R |
| 3,524,091 | 8/1970 | Suzuki et al. ........................ | 310/162 |
| 3,579,277 | 5/1971 | Imahashi.............................. | 310/156 |
| 3,590,353 | 6/1971 | Kobayashi et al. ............. | 310/156 X |
| 3,594,785 | 7/1971 | Orenbuch ........................... | 310/49 R |
| 3,604,961 | 9/1971 | Saldinger ......................... | 310/218 X |
| 3,790,834 | 2/1974 | Tanaka ............................... | 310/156 |
| 3,866,104 | 2/1975 | Heine................................. | 310/49 R |

*Primary Examiner*—Mark O. Budd
*Attorney, Agent, or Firm*—Toren, McGeady and Stanger

[57] ABSTRACT

In the disclosed motor, completely or partially wound inwardly projecting stator poles form three or more pole pairs that surround a permanent magnet rotor. The stator poles per phase are grouped together into a single pole group with alternating north-south poles, and groupwise are arranged on the inner circumference of the stator so that a mechanical offset angle $\delta \approx 180/\text{mp}+\epsilon$ exists between the pole groups and the pole division angles $\tau p$ of the stator and rotor are equal or deviate from each other only slightly.

22 Claims, 14 Drawing Figures

MOTOR WITH 16 ROTOR POLES
AND 4 STATOR POLE GROUPS

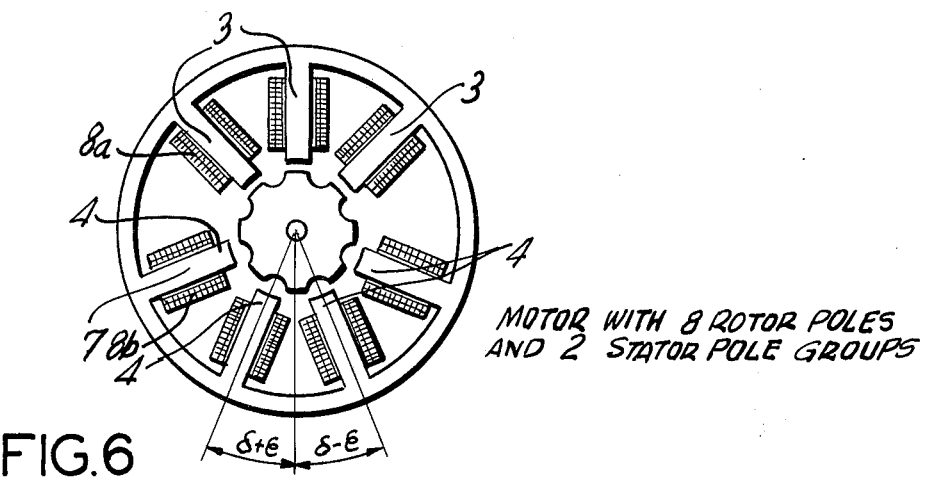
FIG.6 MOTOR WITH 8 ROTOR POLES AND 2 STATOR POLE GROUPS
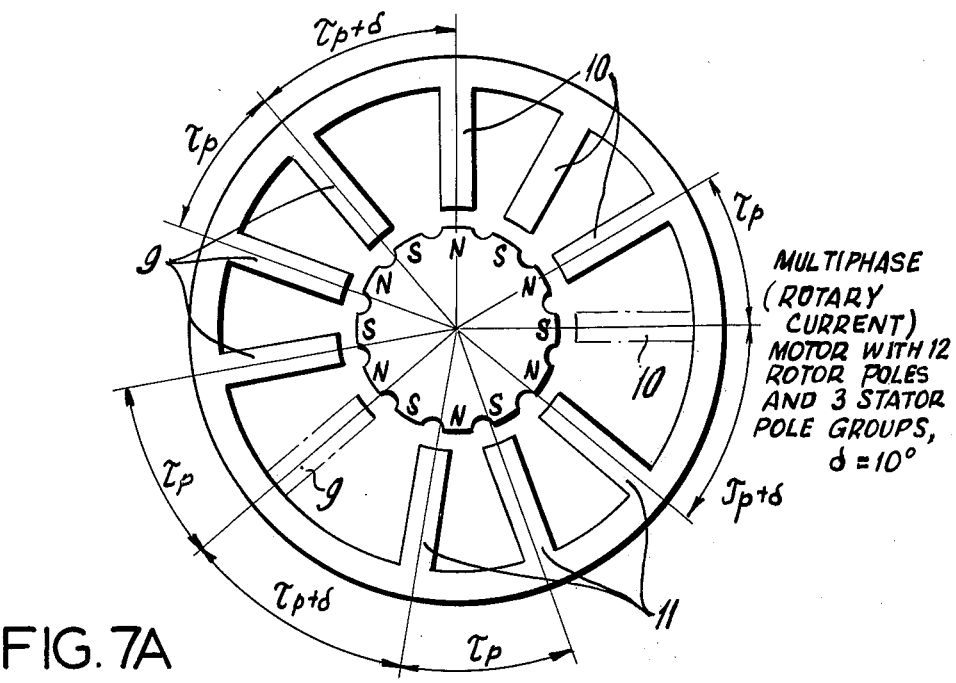
FIG.7A MULTIPHASE (ROTARY CURRENT) MOTOR WITH 12 ROTOR POLES AND 3 STATOR POLE GROUPS, $\delta = 10°$
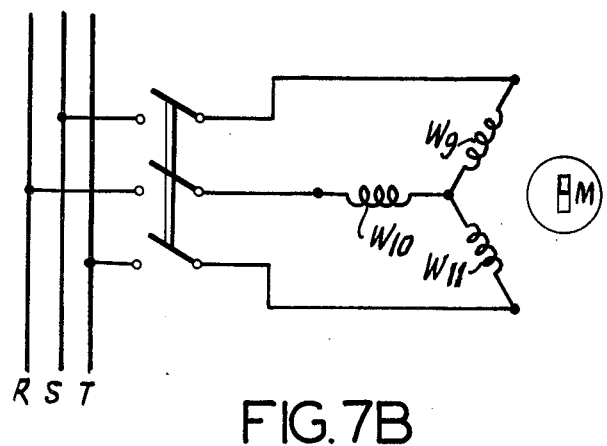
FIG.7B

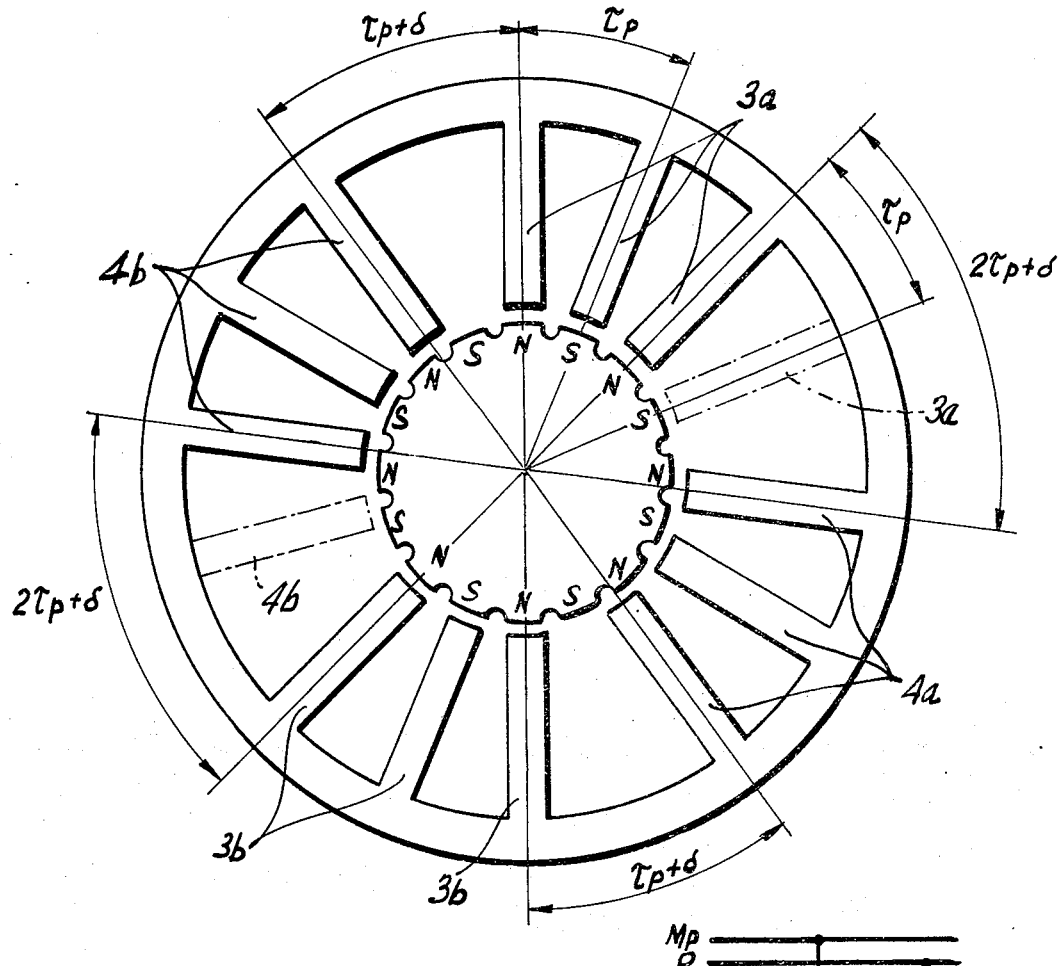
$3a = 3b \qquad 4a = 4b$
MOTOR WITH 16 ROTOR POLES
AND 4 STATOR POLE GROUPS
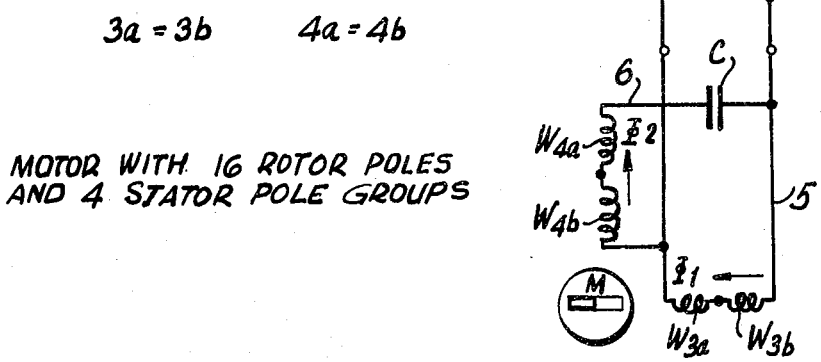
FIG. 8

SELF-STARTING SYNCHRONOUS MOTOR WITH PERMANENT MAGNET ROTOR

BACKGROUND OF THE INVENTION

This invention relates to multipolar synchronous motors of the heteropolar type with completely or partly wound projecting stator poles and a permanent magnet rotor.

Many examples of motors of this type exist. However, these have various disadvantages, particularly in matters such as structural size, weight, power-weight ratio, and manufacturing costs.

The invention will best be understood from the following detailed description of preferred embodiments thereof, when read in light of the accompanying drawings. The various features characterizing the invention are pointed out in the claims forming a part of this application.

BRIEF DESCRIPTION OF THE DRAWINGS

FIG. 6 is a cross-sectional view of another motor embodying features of the invention.

FIG. 7A is an end view of the stator and rotor of a motor embodying features of the invention.

FIG. 7B is a circuit diagram of a motor embodying features of the invention.

FIG. 8 is an end view of the stator and rotor of another motor embodying features of the invention.

DETAILED DESCRIPTION OF PREFERRED EMBODIMENTS

Figure 1A:
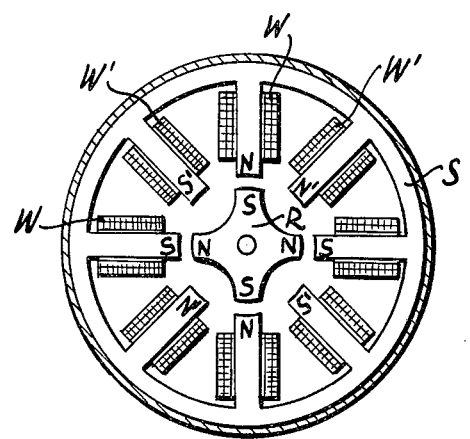
FIG. 1A is a cross section IA—IA of the motor in FIG. 1B.
Figure 1B:
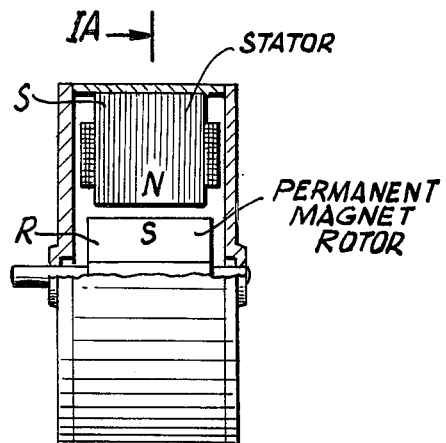
FIG. 1B is a partly sectional view of a motor according to the prior art.
Figure 1C:
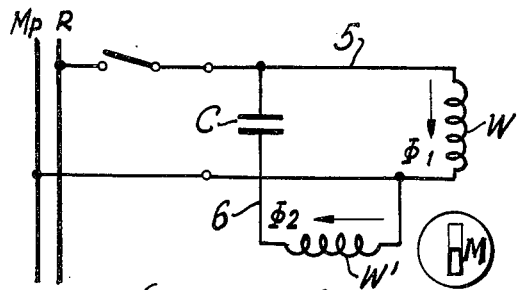
FIG. 1C is a schematic diagram of the circuit formed by the motor in FIGS. 1A and 1B.

In the construction customary for various types of motors as shown in FIGS. 1A, 1B and 1C, phase winding W and W' are alternately mounted along the inner periphery of a stator S. Due to the moment of inertia of a polarized permanent magnet rotor R, operation of the motor results in substantial running and starting difficulties because, under otherwise equal conditions, the step angle and that the needed starting acceleration of the rotor become too great.

Figure 2A:
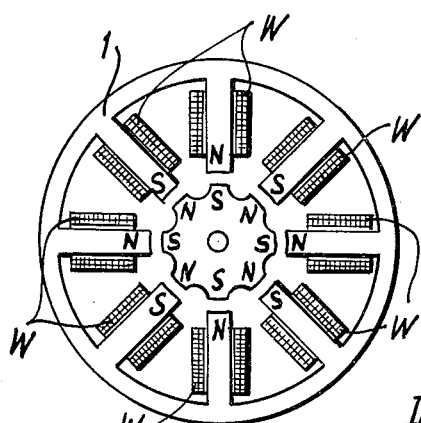
FIGS. 2A and 2B are cross-sections IIA—IIA and IIB—IIB of the motor shown in FIG. 2C.
Figure 2B:
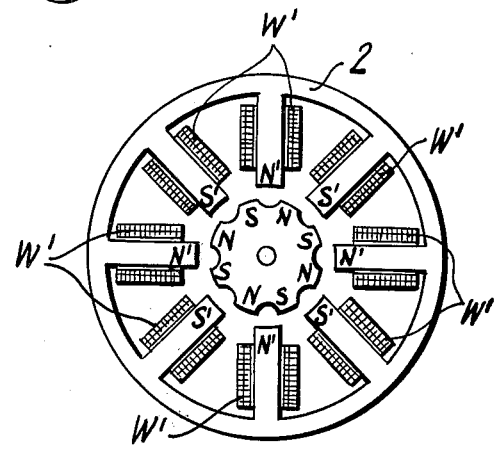
Figure 2C:
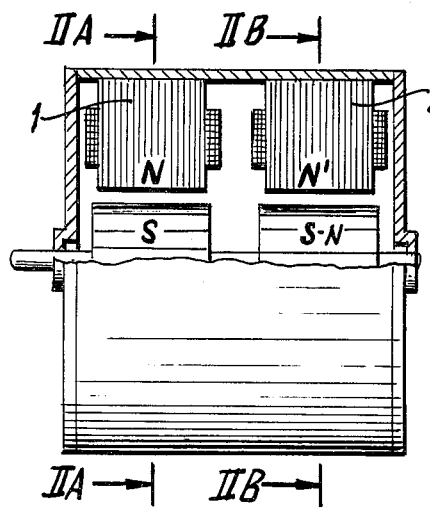
FIG. 2C is a cross-sectional view of a motor according to the prior art.

In the often used synchronous motor principle illustrated in FIGS. 2A, 2B, and 2C, two stators 1 and 2 are positioned axially one behind the other in one motor. Such a motor exhibits a comparatively excessive motor length and a mechanically unfavorable construction.

Figure 3A:
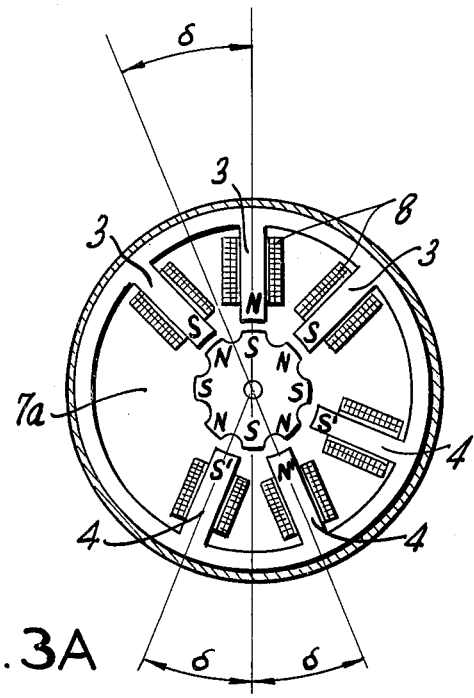
FIG. 3A is a cross-section IIIA—IIIA of FIG. 3B.
Figure 3B:
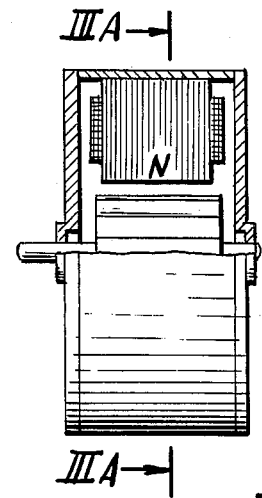
FIG. 3B is a partly cross-sectional view of a motor embodying features of the invention.
Figure 5:
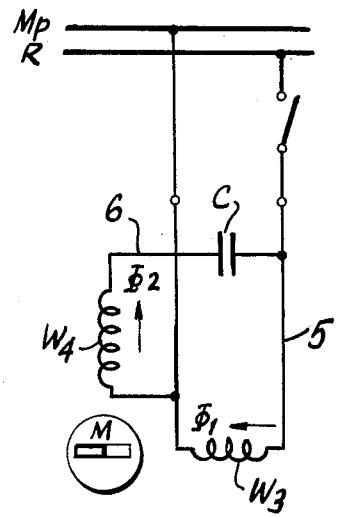
FIG. 5 is a circuit diagram illustrating the circuit of the motors in FIGS. 3A, 3B, and 4.

FIGS. 3A and 3B illustrate the principles of the construction of one-stator motor embodying features of the invention. Here, the stator poles P are radially arranged in two pole groups 3 and 4 on the interior stator periphery. The arrangement is such that a mechanical displacement angle $\delta \approx \tau p/2$ is formed between the pole groups. The windings on the individual stator poles within each group are connected in series according to one embodiment of the invention, and in parallel according to another embodiment of the invention. In FIG. 5, the phase 5 is connected with the winding W3 of the pole group 3, and the phase 6, which is shifted approximately 90°, is connected with the winding W4 of the pole group 4.

In a two-phase motor, in order to achieve a circular rotary field, and thereby the optimum operating conditions, the angle $\delta$ must equal $90°/p$ with the ideal magnetic and electrical relationship $\delta = 90°$, where $p$ is the number of pole pairs on the rotor. Aside from this, it is well known that in two-phase motors the sum of the mechanical offset angle $p \cdot \delta$ and the electrical angle $\gamma$ between the stator fluxes $\Phi_1$ and $\Phi_2$ should exhibit the value 180°.

However, the electrical phase displacement angle $\gamma$ of two-phase condensor motors depends significantly upon the motor load, the circuit voltage, and the capacitor ganging or aligning. In this manner, a more or less strong elliptical rotating field is formed that depends on these values. Motors embodying features of the invention have the advantage of achieving good starting characteristics despite these effects. According to a feature of the invention, the displacement angle between the pole groups is adapted to the electrical and switching technical data or values. This is done according to the invention by making the mechanical pole displacement angle $\delta$, for $m$ phases, $180/m.p. + \epsilon$.

Figure 4:
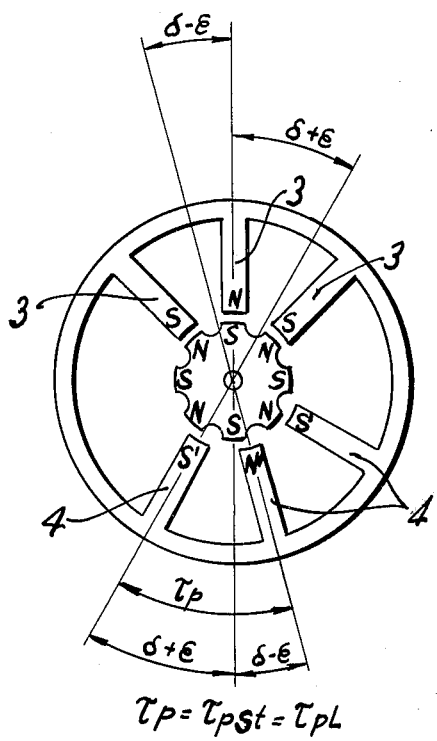
FIG. 4 is a cross-sectional view of another motor embodying features of the invention.

According to another feature of the invention, the displacement angle is increased by a sum of about $\epsilon$, as shown in FIG. 4. The particular value of the angle $\epsilon$ depends upon the electromagnetic characteristics of the motor and can lie between 0 and $\delta/2$. This produces a mechanically and magnetically optimal spatial arrangement of the stator poles.

The hitherto described arrangements embodying the invention for equal numbers of stator poles per pole group produce a large pole gap 7a on one sie. According to another embodiment of the invention, a further stator pole 7 is thus inserted in this pole gap as shown in FIG. 6. This stator pole 7 is electrically associated with a pole group. The stator windings 8 of the pole groups 3 and 4 are dimensioned so that the current in these windings and the phase angle between the winding voltage and the winding current of both pole groups is as equal as possible. This facilitates reverse operation with symmetrical turning moment or torque requirements and idling of the motor. The winding data of the stator coils 8a and 8b are then only equal within the pole group.

According to another embodiment of the invention, the additional stator pole 7 is used for a separate direct current braking for strengthening the electric or magnetic stopping moment which, after switching off the motor, is already available and generated by the permanent magnet rotor.

Self-starting multipole (multiphase) synchronous motors with permanent magnet rotor for a shaft power from about 10 watts must be provided with higher numbers of rotor poles, that is, they must be operated as slow-moving engines because of the rapid rate at which the moment of inertia of the rotor grows with power.

FIG. 8 illustrates an embodiment of the invention utilizing these considerations. Here, two or more pole groups are arranged for each phase and are symmetrically distributed on the stator circumference. This results in the most suitable arrangement considering both the mechanical and electromagnetic conditions.

Naturally, in similar manner also stators for rotary current motors can be produced. FIG. 7 illustrates a sectional view of the stator and rotor of a three-phase motor. In accordance with FIG. 7, there are three pole groups,—9, 10 and 11—, with either three single poles in each or, if the dot-dash poles are included, with two groups of four poles each and one group of three poles. It follows that with $\delta = 180/m.p.$ with $p = 6$, a group offset angle of 10° is obtained.

Motors manufactured according to the invention are suitable also for stepping operation, and therefore if their windings are adapted can be utilized as stepping motors.

According to another embodiment of the invention, motors utilizing features of the invention are used as two-phase motors, capacitor or condensor motors, rotary current or multiphase motors, and stepping motors.

The invention makes it possible to decrease the volume of a motor, simplifies the mounting thereof, improves the electromechanical operating and output efficiency, and lowers the manufacturing costs. This is effectively achieved in that the advantages of the mechanically suitable construction of the motor of FIG. 1 and the significant electromechanical and starting dynamic improvements of motors according to FIG. 2 are united in a motor with a single stator body.

The advantages of motors according to the invention reside in that:

1. The number of stator energizing coils, coil heads, connection conductors, and interior soldering positions can be reduced to less than half of those in hitherto generally used constructions shown in FIG. 2, while having equal or corresponding electrical and mechanical data or characteristics.

2. The rotor construction is significantly simplified. Only one rotor magnet is present, and no pole offset angle $\delta$ between the two magnets need be arranged in a manner corresponding to FIG. 2.

3. Only a single stator block need be assembled or formed out of the stator layers.

4. No spacing elements are necessary between the stator blocks, thereby making the motor more stable mechanically.

5. The structural length of the motor is substantially decreased.

6. The manufacturing costs may be significantly diminished.

7. The technical and economic advantages produced by the invention are quite substantial.

What we claim is:

1. A multiphase heteropolar synchronous motor, comprising a permanent magnet rotor having a plurality of rotor poles, a stator surrounding the rotor and having a plurality of inwardly projecting stator poles, $m$ phase windings on the poles, the poles forming a plurality of pairs $p$ greater than two, the stator being formed of only a single stator body, the stator poles forming groups of three or more poles each with alternating north and south poles, the poles being grouped together at the interior of the stator circumference so that a mechanical offset angle in excess of $180/mp$ is formed between the pole groups for $m$ phases and within each group the interpole distances of the stator being substantially equal or deviate only slightly from the interpole distances of the rotor, the rotor poles being permanently magnetized with peripherally alternate polarities.

2. A motor as in claim 1, characterized in that the angle exceeds $180/mp$ by a value less than $90/mp$.

3. A motor as in claim 1 characterized in that with $2p$ rotor poles the stator includes $2p - m$ projecting stator poles.

4. A motor as in claim 2, characterized in that with $2p$ rotor poles the stator includes $2p-m$ projecting stator poles.

5. A motor as in claim 1, characterized in that with $2p$ rotor poles the number of inwardly projecting stator poles from the rotor equals one of $2p-m+1$ and $2p-m+2$.

6. A motor as in claim 1, characterized in that all windings on each stator pole are the same.

7. A motor as in claim 3, characterized in that all windings on each stator pole are the same.

8. A motor as in claim 3, characterized in that all windings on each stator pole are the same.

9. A motor as in claim 5, characterized in that all windings on each stator pole are the same.

10. A motor as in claim 1, characterized in that the stator windings in each pole group are equal to each other but only within the pole group.

11. A motor as in claim 2, characterized in that the stator windings in each pole group are equal to each other but only within the pole group.

12. A motor as in claim 4, characterized in that the stator windings in each pole group are equal to each other but only within the pole group.

13. A motor as in claim 5, characterized in that the stator windings in each pole group are equal to each other but only within the pole group.

14. A motor as in claim 1, wherein means energize the windings for operation as a stepping motor.

15. A multiphase heteropolar synchronous motor, comprising a permanent magnet rotor having a plurality of rotor poles, a stator surrounding the rotor and having a plurality of inwardly projecting stator poles, windings on the poles forming $m$ phases, the poles forming a plurality of pairs $p$ greater than 2, characterized in that the stator poles circumferentially form two groups of adjacent poles with alternating north and south poles within each group, the poles within each group on the stator having interpole distances substantially equal to or deviating only slightly from the interpole distances of the rotor poles, said rotor poles being permanently magnetized with peripherally alternating polarities, the circumferential distances between the groups of the poles being greater than the interpole distances between poles of each group, the groups of poles being offset from equiangular distribution about the periphery of the stator.

16. A motor as in claim 15 characterized in that the angular offset is less than $90/mp°$.

17. A motor as in claim 1, wherein each of said stator poles has a cross-section at its end at least as small as throughout its length.

18. A motor as in claim 1, wherein said stator poles each has a substantially uniform cross-section throughout its length.

19. A motor as in claim 1, wherein said pole groups have an interpole distance of $(a + 0.5) T_p$, wherein $a$ is an integer greater than 0 and $T_p$ is the pole pitch within a group, said poles forming a two-phase motor.

20. A motor as in claim 1, wherein said groups of stator poles are separated from each other by a distance $(a + 0.333) T_p$, wherein a is an integer greater than 0 and $T_p$ is the pole pitch within a group, said poles forming a three-phase motor.

21. An apparatus as in claim 19, wherein said stator poles each has a substantially uniform cross-section throughout its length.

22. An apparatus as in claim 20, wherein said stator poles each has a substantially uniform cross-section throughout its length.

* * * * *